United States Patent
Spoor et al.

(10) Patent No.: US 8,908,968 B1
(45) Date of Patent: Dec. 9, 2014

(54) IDENTIFYING AND ENSURING THE AUTHENTICITY OF OBJECTS

(75) Inventors: Todd Alan Spoor, Los Angeles, CA (US); John Ambrose Mulcahy, St. Thomas, VI (US); Scott Stanaway McCrae, Potomac Falls, VA (US); Kevin Francis Cassidy, Leesburg, VA (US)

(73) Assignee: Movie Poster Grading and Registry Company, LLC, Los Angeles, CA (US)

( * ) Notice: Subject to any disclaimer, the term of this patent is extended or adjusted under 35 U.S.C. 154(b) by 300 days.

(21) Appl. No.: 12/914,451

(22) Filed: Oct. 28, 2010

(51) Int. Cl.
*G06K 9/00* (2006.01)
*G08B 13/14* (2006.01)

(52) U.S. Cl.
USPC ........................................ 382/181; 340/572.1

(58) Field of Classification Search
None
See application file for complete search history.

(56) References Cited

U.S. PATENT DOCUMENTS

| | | |
|---|---|---|
| 4,441,943 A | 4/1984 | Kydd |
| 4,880,750 A | 11/1989 | Francoeur |
| 5,139,812 A | 8/1992 | Lebacq |
| 5,148,534 A * | 9/1992 | Comerford ............... 711/164 |
| 5,194,289 A | 3/1993 | Butland |
| 5,360,628 A | 11/1994 | Butland |
| 6,612,494 B1 | 9/2003 | Outwater |
| 6,847,299 B2 * | 1/2005 | Franks ................. 340/572.1 |
| 2004/0088231 A1* | 5/2004 | Davis, Jr. ................... 705/28 |
| 2007/0118436 A1* | 5/2007 | McDowell et al. .......... 705/26 |
| 2008/0143530 A1* | 6/2008 | Florio ................... 340/572.1 |
| 2008/0272886 A1* | 11/2008 | Tiller et al. ............. 340/10.1 |
| 2009/0303044 A1* | 12/2009 | Furuichi et al. ......... 340/568.1 |

* cited by examiner

*Primary Examiner* — Jason M Repko
*Assistant Examiner* — Ryan P Potts
(74) *Attorney, Agent, or Firm* — Rossi, Kimms & McDowell LLP

(57) ABSTRACT

Identifying and ensuring object authenticity can occur by identifying an object by acquiring an image of the object, identifying flaws present in or on the object, associating the flaws with respective locations or regions in the image, determining a quality score indicating a condition of the object based at least upon an analysis of the identified flaws, and generating and storing a data record with all of this identifying information. A tag which provides an identifier that links the object to the data record is placed on the object. When authenticity of the object needs to be verified at a later time, the tag identifier is retrieved and used to retrieve the data record. The identifying information can then be compared with the object as it currently appears. If the object as it currently appears corresponds with the identifying information, authenticity is verified. Otherwise, fraud can be suspected.

9 Claims, 7 Drawing Sheets

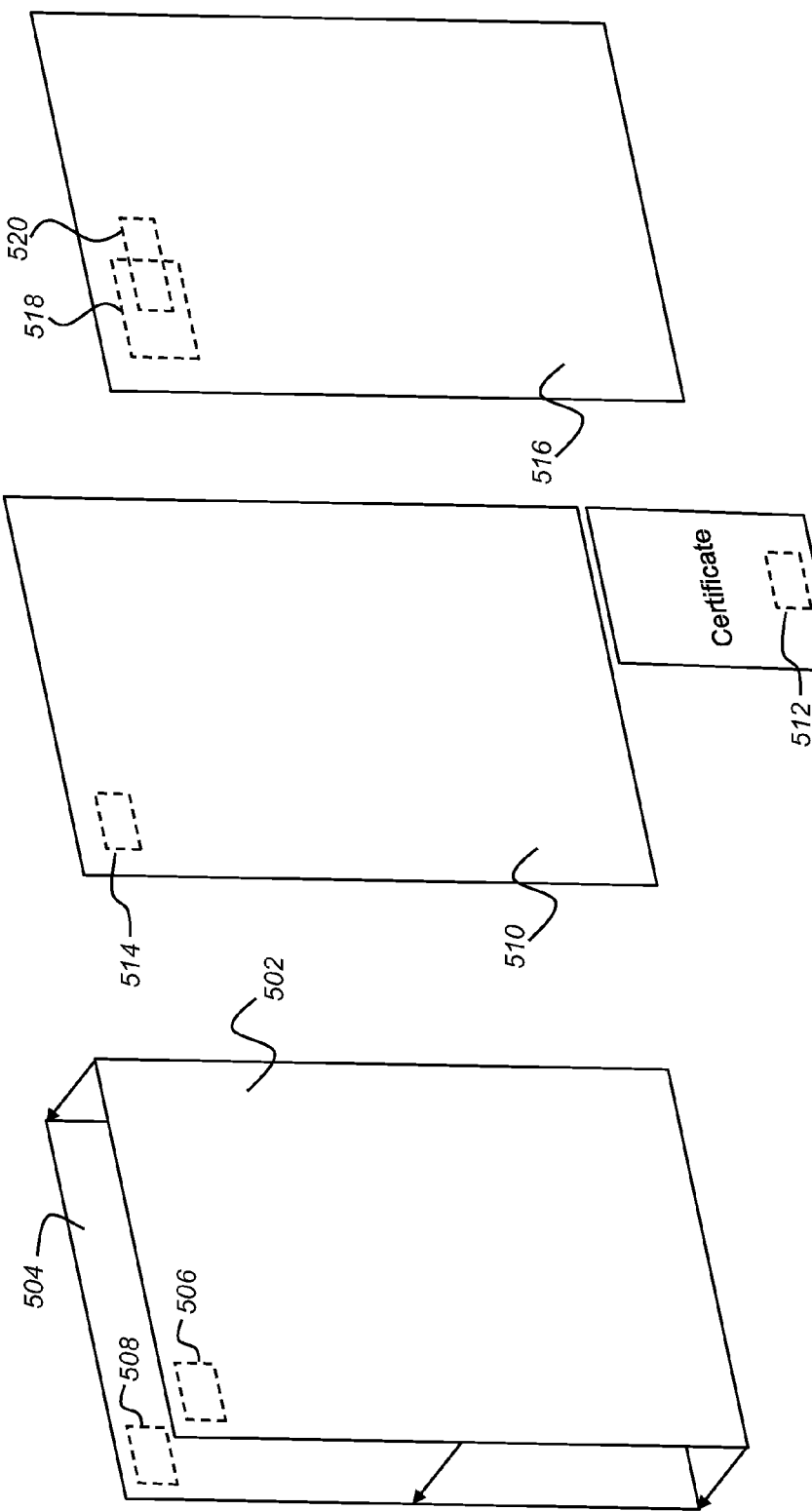

FIG. 6

| Tag ID | Internal ID | Textual Object Description | | Identifying Information | | | |
|---|---|---|---|---|---|---|---|
| | | Title | Actors | Image(s) of Object | Quality Score | Date of Quality Score | Flaw List |
| 3485 | A21 | Gone with the Wind | Thomas Mitchell; ... | A21-1.bmp | A | 15-Aug-10 | (Tear, 0.5", Image Region, Location A in A21-1.bmp) |
| 4792 | A22 | Casablanca | Humphrey Bogart; ... | A22-1.bmp; ... | B+ | 15-Aug-10 | (Tape Mark, Border, Location B in A22-1.bmp); ... |
| 2038 | A23 | Psycho | Anthony Perkins; ... | A23-1.bmp; ... | A- | 15-Aug-10 | (Backing, Linen, Location C in A23-1.bmp); ... |

600, 601, 602, 603, 604, 605, 606, 607, 608, 609, 610, 611, 612, 613

IDENTIFYING AND ENSURING THE AUTHENTICITY OF OBJECTS

FIELD OF THE INVENTION

This invention relates to identifying and ensuring object authenticity.

BACKGROUND

Today, scarce and top quality movie posters are selling at an all-time high, and the industry is continuing to grow. Unfortunately, technology and restoration experts have infiltrated this industry with fraudulent reproductions of rare and collectable posters. This industry lacks standards and sources of information that can provide collectors the means to preserve integrity in the trading of these posters. Accordingly, a need in the art exists for improved solutions that identify and ensure the authenticity of movie posters.

SUMMARY

The above-described problems are addressed and a technical solution is achieved in the art by systems and methods for identifying and ensuring the authenticity of objects, according to various embodiments of the present invention.

In some embodiments, an image of an object, which may be ephemera, is acquired, and flaws present on or in the object are identified. Each of the identified flaws is associated with a location in the image of the object. A quality score is determined indicating a condition of the object based at least upon an analysis of the identified flaws. A first identifier associated with the object is generated, and a data record is generated including the first identifier, the image of the object, indications of the identified flaws, indications of the locations of the identified flaws in the image of the object, and the quality score. The data record is stored in a processor-accessible memory device system. At least the generating steps are performed at least in part by a data processing device system.

In some embodiments, a tag is attached to the object or a certificate associated with the object, the tag including a second identifier associated with the tag. The second identifier is included in the data record, and the data record including the second identifier is stored in the processor-accessible memory device system.

In some embodiments, the image of the object, the indications of the identified flaws, the indications of the locations of the identified flaws in the image of the object, and the quality score are identifying information for identifying the object. In some of these embodiments, a request for identifying information is received, the request including the second identifier. At least the image of the object, the indications of the identified flaws, the indications of the locations of the identified flaws in the image of the object, and the quality score are retrieved as the identifying information from the processor-accessible memory device system by locating the data record according to the second identifier received in the request. The retrieved identifying information is transmitted in response to the request.

In some embodiments, the second identifier included in the request is obtained by an interaction of radiation with a tag on an object being evaluated or on a certificate associated with the object being evaluated. In some of these embodiments, it is determined whether the retrieved identifying information corresponds to the object being evaluated based at least upon a comparison of the retrieved identifying information and the object being evaluated. The object being evaluated is determined to be authentic if it is determined that the retrieved identifying information corresponds to the object being evaluated. The object being evaluated is determined to be fraudulent if it is determined that the retrieved identifying information does not correspond to the object being evaluated.

In some embodiments, the tag is a first tag, and a second tag is attached to the object or the certificate associated with the object, the second tag including a third identifier associated with the second tag. The third identifier is included in the data record; and the data record including the third identifier is stored in the processor-accessible memory device system.

The second identifier and the third identifier may or may not represent the same identifier. The second tag can be made at least partially of an invisible ink. The second tag can be made at least partially of a biologic marker. The first tag and the second tag can both be on the certificate or can both be on or in the object. A portion of the second tag can be overlaid on the first tag, and a portion of the second tag not overlaid on the first tag can be located directly on the object.

In some embodiments, the object is a paper-based collectable artifact, and an acid-free tamper-resistant radiation-reflective tag is attached to the paper-based collectable artifact. In some of these embodiments, the tag encoded with a tag identifier. The tag identifier is retrieved based at least upon a reading from an interaction of radiation with the tag. The tag identifier, an identifier corresponding to the retrieved tag identifier, or both is/are submitted to a first computer-accessible memory device system. Received from the first computer-accessible memory device system is identifying information identifying the paper-based collectable artifact in response to the submitting, and the identifying information is stored in a second computer-accessible memory device system. At least the retrieving, submitting, receiving, and storing steps are performed at least in part by a data processing device system. In some embodiments, the submitting step is performed by a hand-held reading device, and the second computer-accessible memory device system is located within the hand-held reading device. The first computer-accessible memory device system may or may not be located remotely from the hand-held reading device.

The paper-based collectable artifact can include only a single-sheet. The paper-based collectable artifact can be a movie, an advertising poster, or a book. The tag can be an RFID tag, and in some of these embodiments, at least some of the identifying information can be stored in the radiation-reflective tag. The identifying information can include a quality score indicating a condition of the paper-based collectable artifact, a date on which the quality score was generated, a title associated with the paper-based collectable artifact, an image of the paper-based collectable artifact, or indications of particular flaws or identifying marks on the paper-based collectable artifact. The tag identifier can be a unique identifier encoded in the tag at a time of manufacture of the tag, the unique identifier being an identifier unique to the tag with respect to all other radiation-reflective tags manufactured by a manufacturer of the tag. The unique identifier can be stored in the first computer-accessible memory device system.

In some embodiments, the paper-based collectable artifact includes a supporting substrate portion, and the tag is attached to the supporting substrate portion of the paper-based collectable artifact. For example, the paper-based collectable artifact can be a movie poster and the supporting substrate can be a linen backing.

In some embodiments, the paper-based collectable artifact includes a product portion supported by the supporting substrate portion, the product portion including a presentation side for display and a non-presentation side. The non-presentation side of the paper-based collectable artifact is attached to the supporting substrate portion, and the tag is located between the supporting substrate portion and the non-presentation side of the paper-based collectable artifact.

Any of the above-described embodiments can be implemented at least as a method or a system including a data processing device system and a communicatively connected processor-accessible memory device system storing instructions that, when executed by the data processing device system, cause the data processing device system to implement the respective method.

In addition to the embodiments described above, further embodiments will become apparent by reference to the drawings and by study of the following detailed description.

BRIEF DESCRIPTION OF THE DRAWINGS

The present invention will be more readily understood from the detailed description of preferred embodiments presented below considered in conjunction with the attached drawings, of which:

FIGS. 5A-5C illustrate possible locations for associating one or more tags with ephemera, according to some embodiments of the present invention;

FIG. 6 illustrates example data records that identify objects and that have been generated by the method of FIG. 2, according to some embodiments of the present invention.

Figure 1:
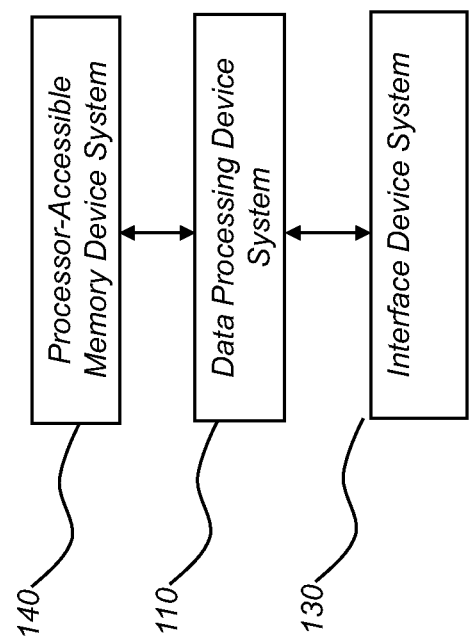
FIG. 1 illustrates a system for identifying and ensuring object authenticity, according to some embodiments of the present invention.

It is to be understood that the attached drawings are for purposes of illustrating the concepts of the invention and may not be to scale.

DETAILED DESCRIPTION

Embodiments of the present invention provide systems and methods for identifying and ensuring object authenticity. For example, some embodiments of the present invention involve identifying an object by acquiring an image of the object, identifying flaws present in or on the object, associating the flaws with respective locations or regions in the image, determining a quality score indicating a condition of the object based at least upon an analysis of the identified flaws, and generating and storing a data record with all of this identifying information. In addition, one or more tags which provide or respectively provide an identifier that links the object to the data record is placed on or in the object or on or in something associated with the object, such as a certificate-of-authenticity. Accordingly, if someone later inquires about the authenticity of the object, the tag identifier(s) is/are read and used to attempt to retrieve the data record. If the data record is found based upon the tag identifier(s), the identifying information can be retrieved from the data record and compared with the object as it currently appears. If the object as it currently appears corresponds with the identifying information, authenticity is verified. Otherwise, fraud can be suspected. In addition, any new or previously undiscovered flaws can be identified in or on the object based upon a comparison of the flaws identified in the data record. If new flaws are found, it can be inferred that the object has been tampered with or damaged since the time that the identifying information was recorded.

Although examples are provided herein in the context of identifying and ensuring the authenticity of ephemera, such as movie posters or other sheet-based or paper-based collectable artifacts, such as books, the present invention is not limited to any particular object type and can be applied to any object to which an identifying tag can be applied or associated. In this regard, although examples herein refer to such a tag as being a radiation-reflective tag that provides an identifying number or code, any tagging technology or manner of tagging can be used, so long as the tag provides an identifier in some manner. Examples of tagging technologies that can be used are RFID, known in the art, and those disclosed in U.S. Pat. No. 5,360,628 titled, "Technique for Labeling an Object for Its Identification and/or Verification", which issued on Nov. 1, 1994 to Butland; U.S. Pat. No. 6,612,494 titled, "Product Authentication System", which issued on Sep. 2, 2003 to Outwater; U.S. Pat. No. 5,194,289 titled, "Method for Labeling an Object for Its Verification", which issued on Mar. 16, 1993 to Butland; U.S. Pat. No. 5,139,812 titled, "Method and Apparatus for High Security Crypto-Marking for Protecting Valuable Objects", which issued on Aug. 18, 1992 to Lebacq; U.S. Pat. No. 4,880,750 titled, "Individual-Specific Antibody Identification Methods", which issued on Nov. 14, 1989 to Francoeur; and U.S. Pat. No. 4,441,943 titled, "Polypeptides as Chemical Tagging Materials", which issued on Apr. 10, 1984 to Kydd; all of which Patents are hereby incorporated herein by reference.

The invention is inclusive of combinations of the embodiments described herein. References to a particular embodiment and the like refer to features that are present in at least one embodiment of the invention. Separate references to an embodiment or particular embodiments or the like do not necessarily refer to the same embodiment or embodiments; however, such embodiments are not mutually exclusive, unless so indicated or as are readily apparent to one of skill in the art. The use of singular, plural, or both singular and plural when referring to a method or methods, system or systems, and the like is not limiting. It should be noted that, unless otherwise explicitly noted or required by context, the word "or" is used in this disclosure in a non-exclusive sense.

FIG. 1 illustrates a system 100 for identifying and ensuring object authenticity, according to embodiments of the present invention. The system 100 includes a data processing device system 110, an interface device system 130, and a processor-accessible memory device system 140. The processor-accessible memory device system 140 and the interface device system 130 are communicatively connected to the data processing device system 110.

Figure 2:
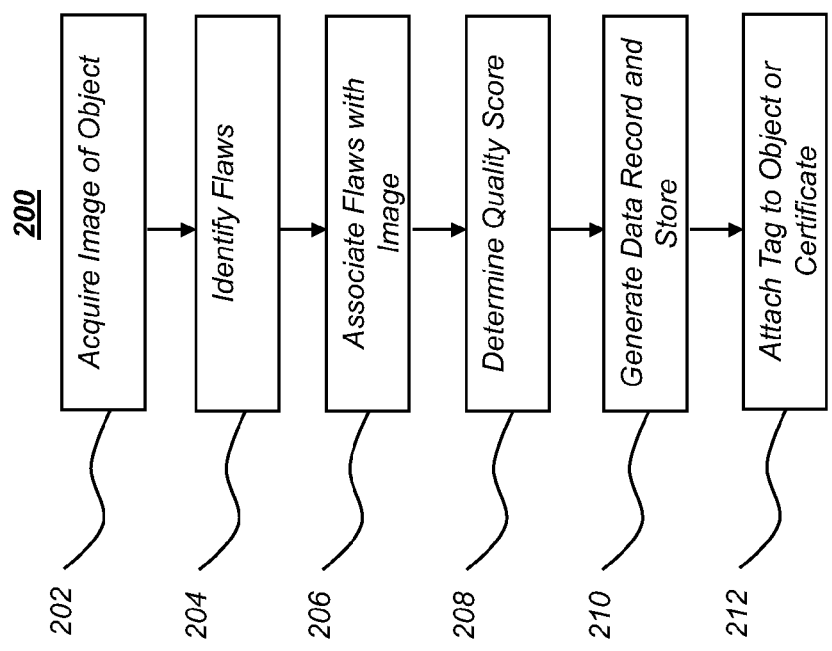
FIG. 2 illustrates a method for identifying an object, according to some embodiments of the present invention.
Figure 3:
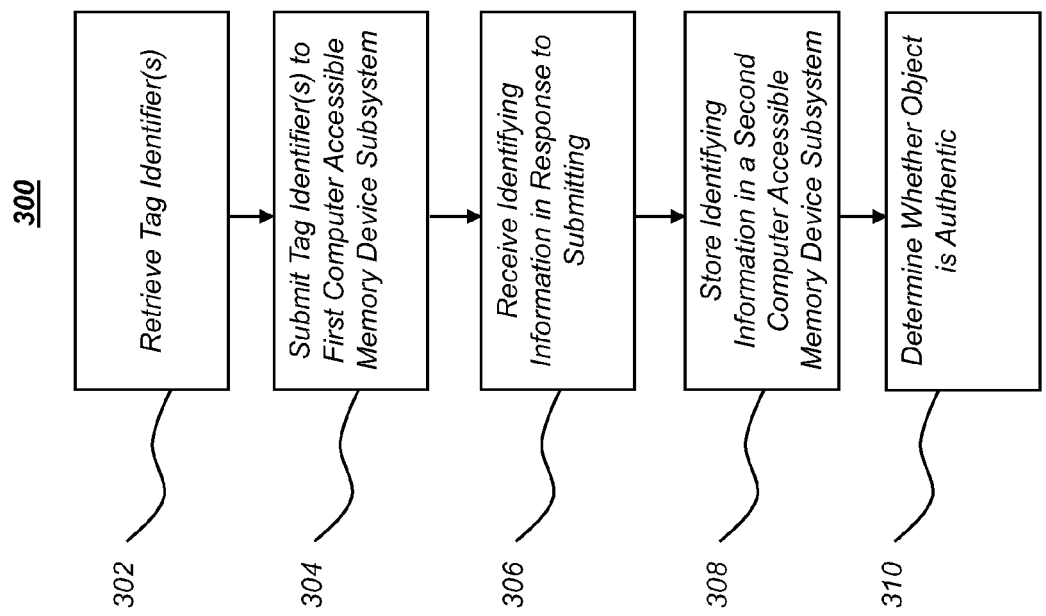
FIG. 3 illustrates a method for ensuring authenticity of an object, according to some embodiments of the present invention.

The data processing device system 110 includes one or more data processing devices that are configured to implement the processes of the various embodiments of the present invention, including the example processes of FIGS. 2 and 3 described herein. The phrases "data processing device" and "data processor" each are intended to include any data processing device, such as a central processing unit ("CPU"), a desktop computer, a laptop computer, a mainframe computer, a personal digital assistant, a Blackberry™, cellular phone, or any other device for processing data, managing data, or handling data, whether implemented with electrical, magnetic, optical, biological components, or otherwise.

The processor-accessible memory device system 140 includes one or more processor-accessible memory devices configured to store information, including the information needed to execute the processes of the various embodiments of the present invention, including the example information shown in FIG. 6 that can be used by the data processing device system 110 to execute elements of the example processes of FIGS. 2 and 3 described herein. Because the system 140 is a device system, it does not include transitory propagating signals per se, and is, by definition, non-transitory. The processor-accessible memory device system 140 can be a distributed processor-accessible memory device system including multiple processor-accessible memory devices communicatively connected to the data processing device system 110 via a plurality of computers and/or devices. On the other hand, the processor-accessible memory device system 140 need not be a distributed processor-accessible memory device system and, consequently, can include one or more processor-accessible memories located within a single data processor or device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the processor-accessible memory device system 140 is shown separately from the data processing device system 110, one of ordinary skill in the art will appreciate that the processor-accessible memory device system 140 can be located completely or partially within the data processing device system 110. Further in this regard, although the interface device system 130 is shown separately from the data processing device system 110, one of ordinary skill in the art will appreciate that such system can be located completely or partially within the data processing device system 110.

The interface device system 130 can include a mouse, a keyboard, another computer, network interface circuitry, a processor-accessible memory, or any device or combination of devices from which data is input to the data processing device system 110. The interface device system 130 also can include a display device, a processor-accessible memory, network interface circuitry, or any device or combination of devices to which data is output by the data processing device system 110. In this regard, if the interface device system 130 includes a processor-accessible memory, such memory can be part of the processor-accessible memory device system 140 even though the interface device system 130 and the processor-accessible memory device system 140 are shown separately in FIG. 1.

Figure 4:
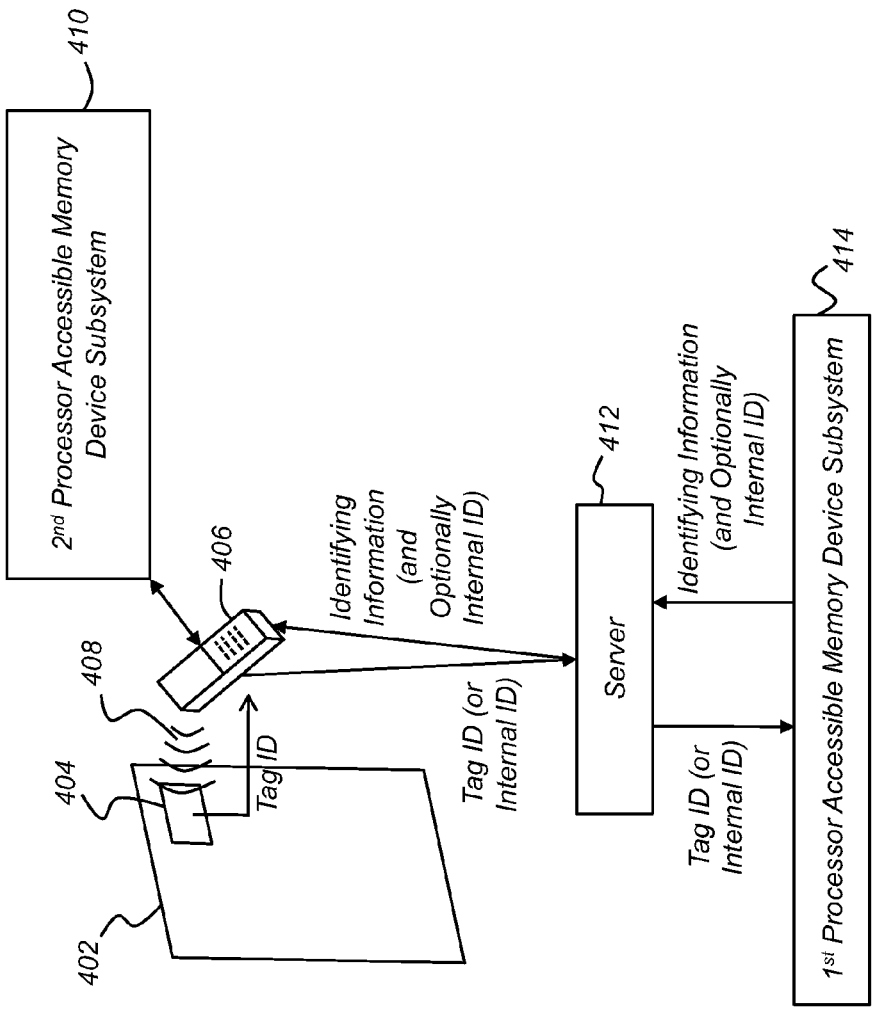
FIG. 4 illustrates a system for ensuring object authenticity, according to some embodiments of the present invention.

FIG. 4 illustrates a specific implementation of the system 100 shown in FIG. 1, according to some embodiments of the present invention. However, the present invention is not limited to the specific system 400 shown in FIG. 4, as discussed above with reference to FIG. 1. In the embodiments of FIG. 4, the system 400 includes a hand-held tag-reading device 406 communicatively connected to a server 412, which is communicatively connected to a first processor accessible memory device subsystem 414. An example of the hand-held tag-reading device 406 is the CS101-2 Handheld Reader, known in the art, from Convergence Systems Limited having a headquarters in Hong Kong. The hand-held device 406 includes a second processor accessible memory device subsystem 410. In relation to FIG. 1, the data processing device system 110 can include the hand-held device 406, the server 412, or both the hand-held device 406 and the server 412. In some embodiments, the tag 404 includes data processing capabilities, and in these cases, the tag can be considered part of the data processing device system 110 of FIG. 1. Further, the first and second processor accessible memory device subsystems 414, 410 can be considered part of the processor-accessible memory device system 140 in FIG. 1. In some embodiments, the tag 404 includes data storage capabilities. In these cases, the tag 404 can also be considered part of the processor-accessible memory device system 140 in FIG. 1.

FIG. 2 illustrates a method 200 for identifying an object, which can be implemented at least in part by the system 100 in FIG. 1 or the system 400 in FIG. 4, according to some embodiments of the present invention. A purpose of the method 200 is to record appropriate identifying information associated with an object and to tag the object (or something associated with the object, such as a certificate) in some manner with one or more tags in order to link the object to the identifying information using at least one tag identifier associated with the at least one tag. At a later time, the authenticity, condition, or both, of the object can be evaluated by retrieving the tag identifier(s) from the tag(s) and comparing the previously-recorded identifying information with the current state of the object, according to the method 300 in FIG. 3, discussed below.

In step 202 in FIG. 2, one or more images of the object are acquired. In this example, the object is assumed to be a sheet-based and paper-based movie poster. As discussed earlier, however, the present invention is not limited to ephemera and pertains to any type of object. This step 202 can be performed in an automated manner with a digital camera included within the interface device system 130 and controlled by the data processing device system 110. Alternatively, the image(s) of the object can be acquired by any other technique and then inputted to the data processing device system 110 via the interface device system 130. For example, a person or other device not affiliated with the data processing device system 110 could acquire the image and upload it to the data processing device system 110.

In step 204, flaws present on or in the object are identified. This step can be performed in an automated manner by the data processing device system 110 executing a program that analyzes the image(s) of the object acquired in step 202 for flaws using techniques known in the art. For example, an image processing program can be executed that looks for tears, fold lines, discoloration, tape marks, or any other type of flaw detectable by an image processing program using techniques known in the art. Alternatively, flaws on or in the object can be identified in any other manner and input to the data processing device system 110 via the interface device system 130. For example, a person that has knowledge in evaluating objects of the particular type for which the image(s) was/were acquired in step 202 can manually evaluate the object to identify the flaws and described them to the data processing device system 110 via the interface device system 130.

In step 206, each of the flaws identified in step 204 are associated with a location in one or more of the images of the object acquired in step 202. If the flaws were identified in an automated manner by the data processing device system 110 in step 204, the locations of the flaws may already be known as a consequence of performing the image processing program or programs in step 204. Alternatively, the locations of the flaws in the image(s) can be generated in any other manner, such as manually, and then input the data processing device system 110 via the interface device system 130. The locations of the flaws in the image(s) of the object can be specified on a pixel-by-pixel basis, such as by generating a mask image that when overlaid on a respective image acquired in step 202 masks out all pixels in which the flaw does not reside. Alternatively, the locations can be specified using mathematical descriptions of shapes, such as circles, squares, triangles, etc., that each encompass a region in an image where the respective flaw resides. It should be noted, however, that the invention is not limited to any particular manner in which the locations of the flaws in the images acquired in step 202 are identified.

In step 208, a quality score indicating a condition of the object is determined based at least upon an analysis of the flaws identified in step 204. This quality score can be determined in an automated manner by the data processing device system 110 using any technique known in the art. Alternatively, the techniques disclosed in U.S. patent application Ser. No. 12/914,521, now U.S. Pat. No. 8,504,309, by Spoor, et al., filed concurrently with the present application, having a title of, "SYSTEMS AND METHODS FOR EVALUATION OF OBJECT CONDITION", which are not known in the art, can be executed by the data processing device system 110 to determine the quality score in step 208. The entire disclosure of such U.S. patent application Ser. No. 12/914,521, referred to above is hereby incorporated herein by reference. Alternatively, the quality score can be generated in any other manner and input to the data processing device system 110 via the interface device system 130.

In step 210, the data processing device system 110 generates a data record associating and recording the information resulting from steps 202, 204, 206, 208, and stores this record in the processor accessible memory device system 140. FIG. 6 shows an example of data records 601-603 that could have been generated for three different objects in step 210. Assume for purposes of this example, that the data record 601 is generated in step 210 for the current object being evaluated. In this regard, data record 601 includes or links to an image "A21-1.bmp" in field 610. This image "A21-1.bmp" was acquired in step 202. The ellipsis in field 610 in data records 602 and 603 illustrate that multiple images are identified in field 610 in situations where multiple images are acquired by the data processing device system 110 in step 202. Such other images, however, are not illustrated in FIG. 6 for purposes of clarity.

Figure 7:
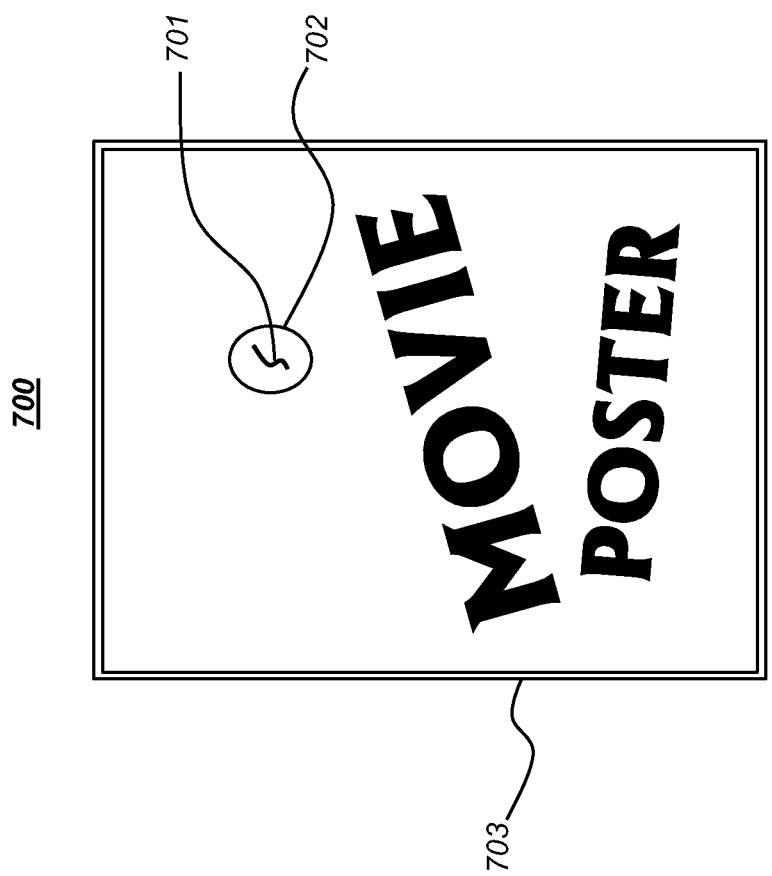
FIG. 7 illustrates an example image of an object with an associated identification of a flaw on the object and a region in the image where the flaw is located, according to some embodiments of the present invention.

The data record 601 also includes a field 613 where the flaws identified in step 204 and the corresponding locations generated in step 206 are identified. In the example of record 601 in FIG. 6, only a single flaw is present in the image A21-1.bmp. The ellipsis in field 613 for each of the data records 602 and 603 indicates that more flaws are identified, although not shown in FIG. 6 for purposes of clarity. The flaw associated with data record 601 is a tear having a length of 0.5 inches within the image region of the movie poster (as opposed to a border region of the movie poster). The location of this flaw is illustrated in FIG. 6, for example, as being at a "Location A" in the image A21-1.bmp. In practice, however, "Location A" in field 613 in data record 601 would be replaced with a mathematical description of the location or region of the corresponding tear flaw, would be replaced, for example, by a link to a mask image specifying the location or region of the corresponding tear flaw, or would be replaced by some other technique for specifying the location or region of the corresponding tear flaw. FIG. 7 illustrates an image 700, which might represent image A21-1.bmp. In FIG. 7, "Location A" might be represented or defined in the flaw field 613 as an ellipse 702 in which the tear 701 identified in the flaw field 613 resides.

There may be instances where a flaw is identifiable in less than all of the images acquired in step 202 and identified in field 610. For example, if two images of a movie poster are required in step 202 respectively representing the front and back sides of a movie poster, a flaw might be visible only on the front side of the movie poster. In this case, such flaw may be associated only with a location in the image representing the front side of the movie poster. However, if the flaw is a tear through the movie poster, and, consequently, is visible from both the front and back sides of the movie poster, such flaw may be associated with locations in both the image of the front of the poster and the image of the back of the poster.

For objects that are more three-dimensional in shape as compared to a movie poster, step 202 might involve acquiring multiple images to assemble a three-dimensional image showing the internal and external structure of the object, such as by using magnetic resonance imaging. In this case, the flaw list 613 might identify a flaw location in each of a plurality of the images, but not all of the images.

The data record 601 also includes a field 611 where the quality score generated in step 208 is inserted. The data record 601 can also include in field 612 a date (or date and time) at which the quality scores was generated. In addition to or in lieu of the date that the quality score was generated, the data record 601 can include a date when the image(s) of the object was/were captured in step 202, a date when flaws were identified in step 204, a date when the flaws were associated with the image(s) in step 206, or combinations of these dates. These dates are useful in evaluating authenticity or deteriorating condition of the object at a later time.

In addition to fields 610-613, the data record 601 can include a textual object description 607. These textual descriptions are useful for helping users index and quickly surmise the content of the data record 601. In situations where the object is a movie poster, the textual object description can include a title field 608 and an actors field 609, which respectively identify the title of the movie and the actors in the movie associated with the movie poster object. In this regard, the image(s) of the movie poster acquired in step 202 can be used by the data processing device system 110 to search a database of movie poster images to determine that the present object being evaluated is a poster of the movie "Gone with the Wind", as shown in field 608 of data record 601. Having identified the movie associated with the movie poster as "Gone with the Wind", the data processing device system 110 can determine from a database the key actors for this movie, such as Thomas Mitchell, as shown in field 609 of data record 601.

Field 606 indicates an internal identifier generated, possibly by the data processing device system 110, to identify the data record 601. By "internal" it is meant that is different than a tag identifier discussed, below, which is associated with a tag attached to the object in step 212. In this regard, the internal identifier may be kept from public view (e.g., not printed on or identifiable from the tag attached to the object in step 212). The tag identifier, discussed below, may be printed on the tag or may be kept unreadable unless accessed in the appropriate manner, such as through appropriate radiation interacting with the tag. In any event, the internal identifier is stored in the data record 610 along with the image or images of the object acquired in step 202, indications of the flaws identified in step 204, indications of the locations of the identified flaws in the image or images of the object, the quality score generated in step 208.

Fields 608-613 can be considered identifying information 604 identifying the object associated with record 601. The internal identifier field 606, the tag identifier field 605, or both can also be considered part of the identifying information 604. Although FIG. 6 has been described in the specific context of data record 601, the substance of the above-discussion also applied to data records 602 and 603, each of which are associated with a different object.

As discussed above, the internal identifier in field 606 is distinguished from an identifier provided by a tag, which is attached to the object or an something associated with the object, such as a certificate, in step 212. In this regard, the tag can be attached in an automated manner using a tagging device or system known in the art, such device or system can be included in the interface device system 130. Alternatively, the tag can be attached at least partially in a manual manner, and the invention is not limited to any particular technique for attaching the tag.

FIG. 4 illustrates a tag 404 attached to a movie poster object 402. In this example, the tag 404 is a radiation reflective tag that provides a tag identifier when appropriate radiation interacts with the tag. For instance, the tag 404 can be in RFID tag, an invisible ink tag, a tag having a biologic marker, combinations thereof, or any other tag known in the art. Although the tag is shown in the upper right-hand corner of the object 402 in FIG. 4, the invention is not limited to any particular location of the tag. In embodiments where the object 402 is a movie poster, it can be preferable to place the tag on the back, or non-image or non-presentation side of the poster. In addition, if the object 402 is a movie poster, it can be preferable for the tag to be acid-free, tamper-resistant, or both. Also in embodiments where the object 402 is a movie poster, it is not uncommon for collectors of movie posters to place a substrate, such as a linen backing, on the backside of the posters. In this case, as shown in FIG. 5A, the tag 404 can be placed on the linen backing 502 at location 506 or between the linen backing 502 and the poster 504 at location 508, for example. Although particular locations 506, 508 are illustrated in FIG. 5, the invention is not limited to any particular location on a substrate or between a substrate and an object for placing the tag. In this regard, a substrate attached to an object can be considered part of the object itself, and the tag can be located within or between different portions of the object, such as between a supporting substrate portion (e.g., the linen backing portion) and a non-substrate or product portion (e.g., the movie poster portion) of the object, between pages of a book object, between an inside cover and the first page of a book object, etc.

In addition, although FIG. 4 illustrates the tag 404 being attached to the object 402, the tag 404 could instead be placed on an object associated with the object 402, such as a certificate, as illustrated in FIG. 5B, where the tag 404 could be placed at location 512.

Further, although FIG. 4 illustrates only a single tag 404, two or more tags can be used. As shown in FIG. 5B, for example, a first tag can be placed at location 512 on a certificate associated with the object 510, and a second tag can be placed at location 514 on the object 510 itself. In another embodiment illustrated by FIG. 5C, both tags can be placed on the object 516. Alternately, both tags can be placed on the certificate shown in FIG. 5B. In the embodiment of FIG. 5C, a portion of a second tag placed at location 520 overlaps a first tag placed at location 518, and another portion of the second tag placed at location 520 that does not overlap the first tag, directly contacts the object 516. In some of these embodiments, the first tag at location 518 could be, for example, an RFID tag, and the second tag at location 520 could be an invisible tag or marker, known in the art. In this manner, if someone tampers with the object 516 by removing the first tag at location 518, such tampering will be apparent because a portion of the second tag at location 520 will remain on the object 516. The same system can be used when both tags are located on the certificate in FIG. 5B, for example.

As discussed above, the tag identifier associated with the tag attached to the object in step 212 can be stored in the data record generated in step 210. See, for example, field 605 in FIG. 6. The tag identifier can be a unique identifier encoded in the tag at a time of manufacture of the tag. This unique identifier can be an identifier unique to the tag with respect to all other radiation reflective tags of a similar type manufactured by a particular manufacturer of the tag, or can be an identifier unique to all other radiation reflective tags of a similar type manufactured by all substantial manufacturers of radiation reflective tags of the similar type. By "substantial" manufacturer, it is meant that the manufacturer is or has a meaningful market presence in the relevant industry. In the case of an RFID tag, the tag identifier can be provided by the manufacturer of the RFID tag.

In embodiments where multiple tags are used, each tag can have its own tag identifier, or some or all of the tags can be configured to refer to a same tag identifier. When multiple tag identifiers are used, these multiple identifiers can be stored in the data record generated in step 210. For example, FIG. 6, instead of having only a single tag ID column 605, could have multiple tag ID columns storing the multiple tag identifiers, so that any one of the tag identifiers can be used to locate the corresponding identifying information 604.

Having identified the object according to the method 200, a method 300 for ensuring authenticity of an object will now be described with respect to FIG. 3, according to some embodiments of the present invention. In step 302, one or more tag identifiers are retrieved. For purposed of clarity, however, it will be assumed in the following example, that only one tag identifier is retrieved. If the tag is a radiation reflective tag, the tag identifier can be retrieved by emitting appropriate radiation that will interact with the tag in order to cause the tag to provide the corresponding tag identifier to a reading device. In the example of FIG. 4, the handheld device 406 emits radiation 408 that interacts with the tag 404. In response to the interaction with the radiation 408, the tag 404 emits or provides the associated tag identifier to the handheld device 406, which records the tag identifier in the second processor accessible memory device subsystem 410. Of course, if another tagging technology is used besides radiation reflective tag technology, then the appropriate technique for retrieving the tag identifier from the tag may be used in step 302. Although FIG. 4 illustrates a single handheld device 406 that both emits the radiation 408 and reads the responding tag identifier, separate devices can be used to emit radiation and to read the responding tag identifier.

In step 304, the handheld device 406 transmits a request for identifying information associated with the object 402 to the server 412. This request can include the tag identifier retrieved in step 302, an identifier associated with the tag identifier, such as the internal identifier referred to in FIG. 6, or both, depending upon whether or not the internal identifier is stored in the second processor accessible memory device subsystem 410. In this regard, in some embodiments, the handheld device of FIG. 4 can include a table that associates known tag identifiers with internal identifiers, e.g., only fields 605 and 606 out of table 600 in FIG. 6. In this case, the handheld device 406 may transmit the internal identifier corresponding to the retrieved tag identifier to the server 412 instead of or in addition to transmitting the retrieved identifier to such server 412.

The server 412 then, in turn, transmits the identifier to the first processor accessible memory device subsystem 414. In this example, the server 412 and the first processor accessible memory device subsystem 414 are located remotely from the handheld device 406. In addition, although a single server is shown in FIG. 4, such server can be replaced with multiple servers communicatively connected to the first processor accessible memory device subsystem 414.

The first processor accessible memory device subsystem 414 can store a table such as that shown in FIG. 6 including tag identifiers 605, internal identifiers 606, and identifying information 604 associated with the tag identifiers and internal identifiers. Using either the tag identifier, the internal identifier, or both, the server 412 accesses the appropriate record in the table 600. If, for some reason, the retrieved tag identifier from step 302 does not have a corresponding internal identifier or is not present in the table 600, for example, the server 412 can transmit an error message to the handheld device 406. This error message can indicate a reading error associated with reading the tag identifier in step 302 or potential fraud associated with the object 402.

Assuming that the tag identifier is properly associated with an internal identifier and a data record in the table 600, the first processor accessible memory device subsystem 414 returns the identifying information 604, or a portion thereof, associated with the corresponding data record to the server 412. Consequently, in step 306, the server 412 receives the identifying information in response to submitting the identifier to the first computer accessible memory device subsystem 414 in step 304. In instances where the handheld device 406 is not yet aware of the internal identifier associated with the tag identifier retrieved in step 302, the first processor accessible memory device subsystem 414 can also return the internal identifier to the server 412 with the identifying information 604.

In this example, assume that the record 601 in FIG. 6 corresponds to the tag identifier retrieved in step 302. In this regard, the identifying information 604 associated with a record 601 is provided to the server 412 from the first processor accessible memory device subsystem 414. The server 412 then provides this identifying information, and optionally the internal identifier associated therewith, to the handheld device 406.

Upon receipt of the identifying information, the handheld device 406 stores the identifying information in the second processor accessible memory device subsystem 410 in step 308. In step 310, a determination is made whether or not the object 402 is authentic. This determination can involve comparing the image or images of the object in field 610 (with accompanying data in field 613) included in the identifying information 604 with (a) the object 402 as it presently appears or with (b) newly acquired image(s) of the object 402. For example, a new image of the object 402 can be acquired by the handheld device 406 or some other device that can provide the newly acquired image or images to the handheld device 406 or some other data processing device. At this time, the handheld device 406 or other data processing device can compare the newly acquired image(s) with the images in field 610 (with accompanying data in field 613) to determine if the object 402 is what it is supposed to be. Alternatively, the handheld device 406 can provide the images, both new and previously acquired, as represented in the identifying information, to the server 412 to perform this comparison using image processing techniques known in the art. Alternatively still, a manual comparison between the previously acquired images and the object as it presently appears can be performed with the results provided to the hand held device 406 or other data processing device in the data processing device system 110.

A determination of non-authenticity at step 310 can occur if the object 404 as it presently appears does not correspond with the identifying information received and stored at steps 306 and 308, respectively. For example, if the image A21-1.bmp of record 601 FIG. 6 shows the presentation side of the movie poster for "Gone with the Wind", and the object 402 is a poster for a different movie, it can be determined in step 310 that the object 402 is not authentic, has been subject to tampering, or that fraud has occurred. Or, if the image A21-1.bmp indicates a tear flaw at "Location A", and the object 404 as it presently appears does not include a tear at "Location A", it can be determined in step 310 that the object 402 is not authentic, has been subject to tampering, or that fraud has occurred.

In addition, the comparison at step 310 between the object as it presently appears and the identifying information retrieved at step 306 can also be used by the data processing device system 110 to determine if new flaws exist. For example, if the object 404 otherwise corresponds with the identifying information, but includes flaws not listed in field 613 and not present in any of the images in field 610, or includes flaws that correspond to flaws in field 613, but the flaws have changed, it can be determined that damage has occurred since the date of the quality score shown, for example, in field 612 of data record 601 in FIG. 6.

It is be understood that the exemplary embodiments are merely illustrative of the present invention and that many variations of the above-described embodiments can be devised by one skilled in the art without departing from the scope of the invention. For example, although FIG. 6 illustrates a table 600 for representing and organizing data, any manner of representing and organizing data can be used. In addition, although a server is shown in FIG. 4, such server is not necessary. In this regard, the first processor accessible memory device subsystem 414 could be a hard drive or non-cache memory in the handheld device 406. The second memory device subsystem 410 could be a cache memory or register, such that the first memory device subsystem 414 is slower or less readily accessible than the second memory device system 410. In other words, the retrieved identifying information from step 306 would be stored in a location where it is more readily accessible to identify the object by storing such information in the second memory device subsystem 410 than in the first memory device subsystem 414. In addition, although the second processor accessible memory device subsystem 410 is shown in FIG. 4 as being communicatively connected to or part of the hand held device 406, all or a portion of such subsystem 410 can be included in the tag 404. For example, all or a portion of the identifying information stored at step 308 could be stored in a data storage device within the tag 404. Further, although the embodiments of FIG. 4 illustrate a handheld device 406 for retrieving the tag identifier from tag 404, a handheld device need not be used, and any data processing device or device system could be used in its place. Further still, the ordering of the steps shown in FIGS. 2 and 3 are not critical and are provided for ease of discussion. However, these steps can be performed in an order different than that shown in these figures. For example, although not exhaustive, steps 202 and 204 in FIG. 2 could be performed in reverse order, and the generation of a data record and storage thereof in step 210 could occur at a different place in the workflow. In addition, step 212 of attaching the tag the object could occur at any point in the method 200. Also, although examples herein describe a certificate (e.g., FIG. 5B) as an object related to the object being evaluated or identified, such related object need not be a certificate and can be any other object that can be associated with the object being evaluated or identified and to which a tag can be attached. It is therefore intended that all such variations be included within the scope of the following claims and their equivalents.

What is claimed is:

1. A method for identifying an object comprising the steps of:
   acquiring an image of the object;
   identifying flaws present on or in the object;
   associating each of the identified flaws with a location in the image of the object;
   determining a quality score indicating a condition of the object based at least upon an analysis of the identified flaws;
   generating a first identifier associated with the object;
   attaching a first tag to the object, the first tag including a second identifier associated with the first tag;
   attaching a second tag to the object, a first portion of the second tag overlapping the first tag when viewed from a direction normal to a surface of the object, and a second portion of the second tag, which is different than the first portion, not overlapping the first tag when viewed from the direction;
   generating a data record including the first identifier, the second identifier, the image of the object, indications of the identified flaws, indications of the locations of the identified flaws in the image of the object, and the quality score; and
   storing the data record in a processor-accessible memory device system,
   wherein at least the generating steps are performed at least in part by a data processing device system.

2. The method of claim 1, wherein the object is ephemera.

3. The method of claim 1, wherein the image of the object, the indications of the identified flaws, the indications of the locations of the identified flaws in the image of the object, and the quality score are identifying information for identifying the object, and wherein the method further comprises the steps of:
   receiving a request for identifying information, the request including the second identifier;
   retrieving at least the image of the object, the indications of the identified flaws, the indications of the locations of the identified flaws in the image of the object, and the quality score as the identifying information from the processor-accessible memory device system by locating the data record according to the second identifier received in the request; and
   transmitting the retrieved identifying information in response to the request.

4. The method of claim 3, wherein the second identifier included in the request is obtained by a reading of the first tag on an object being evaluated, and wherein the method further comprises the steps of:
   determining whether the retrieved identifying information corresponds to the object being evaluated based at least upon a comparison of the retrieved identifying information and the object being evaluated;
   determining that the object being evaluated is authentic if it is determined that the retrieved identifying information corresponds to the object being evaluated; and
   determining that the object being evaluated is fraudulent if it is determined that the retrieved identifying information does not correspond to the object being evaluated.

5. The method of claim 1, wherein the second tag includes a third identifier associated with the second tag, the second identifier and the third identifier being different identifiers, and wherein the method further comprises the steps of:
   including the third identifier in the data record; and
   storing the data record including the third identifier in the processor-accessible memory device system.

6. The method of claim 1, wherein the second tag is made at least partially of a biologic marker.

7. The method of claim 1, wherein the second portion of the second tag is not overlaid on the first tag and is located directly on the object.

8. The method of claim 1, wherein the second tag extends across an edge of the first tag.

9. A method for identifying an object comprising the steps of:
   acquiring an image of the object;
   identifying flaws present on or in the object;
   associating each of the identified flaws with a location in the image of the object;
   determining a quality score indicating a condition of the object based at least upon an analysis of the identified flaws;
   attaching a first tag to a certificate associated with the object, the first tag being an RFID tag;
   attaching a second tag to the first tag, the second tag being an invisible ink biologic marker, a first portion of the second tag overlapping the first tag when viewed from a direction normal to a surface of the object, and a second portion of the second tag, which is different than the first portion, not overlapping the first tag when viewed from the direction;
   attaching a third tag to the object, the third tag being an RFID tag;
   attaching a fourth tag to the third tag, the third tag being an invisible ink biologic marker;
   attaching a fifth tag to the object, the fifth tag being an invisible ink biologic marker;
   generating a data record including an identifier associated with the first tag, the second tag, the third tag, the fourth tag, or the fifth tag, the data record further including the image of the object, indications of the identified flaws, indications of the locations of the identified flaws in the image of the object, and the quality score; and
   storing the data record in a processor-accessible memory device system,
   wherein at least the generating step is performed at least in part by a data processing device system.

* * * * *